(12) United States Patent
Wang et al.

(10) Patent No.: US 9,819,176 B2
(45) Date of Patent: Nov. 14, 2017

(54) LOW CAPACITANCE TRANSIENT VOLTAGE SUPPRESSOR

(71) Applicant: Silergy Semiconductor Technology (Hangzhou) LTD, Hangzhou (CN)

(72) Inventors: Albert Z. Wang, Grand Cayman (KY); Wen-Chin Wu, Grand Cayman (KY); Fei Yao, Grand Cayman (KY); Bo Qin, Grand Cayman (KY)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 31 days.

(21) Appl. No.: 14/158,683

(22) Filed: Jan. 17, 2014

(65) Prior Publication Data

US 2015/0207312 A1    Jul. 23, 2015

(51) Int. Cl.
*H02H 9/00* (2006.01)
*H02H 9/04* (2006.01)

(52) U.S. Cl.
CPC .................. *H02H 9/046* (2013.01)

(58) Field of Classification Search
CPC ................ H02H 9/04; H02H 9/046
USPC .................................. 361/56, 111
See application file for complete search history.

(56) References Cited

U.S. PATENT DOCUMENTS

| 4,110,775 | A | * | 8/1978 | Festa | 257/484 |
| 4,484,206 | A | * | 11/1984 | Moroshima et al. | 257/606 |
| 5,708,550 | A | * | 1/1998 | Avery | H01L 27/0251 361/111 |
| 7,019,368 | B1 | * | 3/2006 | McCollum et al. | 257/360 |
| 8,143,690 | B2 | * | 3/2012 | Park et al. | 257/476 |
| 2006/0050453 | A1 | * | 3/2006 | Duvvury et al. | 361/56 |
| 2009/0045457 | A1 | * | 2/2009 | Bobde | H01L 27/0255 257/328 |
| 2011/0069419 | A1 | * | 3/2011 | Su et al. | 361/56 |
| 2011/0309476 | A1 | * | 12/2011 | Mita | H01L 27/0814 257/546 |
| 2015/0002967 | A1 | * | 1/2015 | Kawase | H02H 9/046 361/56 |

* cited by examiner

*Primary Examiner* — Thienvu Tran
*Assistant Examiner* — Lucy Thomas

(57) ABSTRACT

A low capacitance transient voltage suppressor is disclosed. The transient voltage suppressor comprises a first diode with a first anode thereof coupled to an I/O port. A first cathode of the first diode and a second cathode of a second diode are respectively coupled to two ends of a resistor. A second anode of the second diode is coupled to a low-voltage terminal. A third anode and a third cathode of a third diode are respectively coupled to the second cathode and the resistor. The third diode induces a third parasitic capacitance smaller than a first capacitance of the first diode and a second parasitic capacitance of the second diode, and the third parasitic capacitance in series with the first and second parasitic capacitances dominate a small capacitance in a path during normal operation.

20 Claims, 5 Drawing Sheets

LOW CAPACITANCE TRANSIENT VOLTAGE SUPPRESSOR

BACKGROUND OF THE INVENTION

Field of the Invention

The present invention relates to a transient voltage suppressor, particularly to a low capacitance transient voltage suppressor.

Description of the Related Art

ESD-induced failure is a major reliability problem to all kinds of electronics, including ICs and electronic systems. ESD protection is hence required for all electronics at both IC level and system board level. The terminology of "ESD protection" is generally used for on-chip IC ESD protection. At system level, it ESD protection is typically called transient voltage suppression (TVS) protection, which generally refers to various transient surge protection according to various industrial standards, including ESD protection (IEC61000-4-2) and lightning protection (IEC61000-4-5), etc. Specifically, TVS refers to system level ESD protection component, which is also called a transient voltage suppressor. TVS components are separate transient protection parts typically placed at the input/output (I/O) interfaces of a system board to defend the system products against any incoming electrical current and voltage surges. Typically, lightning protection is considered as a different type of TVS protection because it involves much stronger transient current and voltage surges, and complies with different protection standard, i.e., IEC61000-4-5. However, while ESD protection is required for all electronics, the ESD protection components always introduce parasitic capacitance, which may affect electronic circuit performance. This is particularly true to the high-speed, high data rate interfaces, such as HDMI, DVI, USB, etc., where any ESD-induced parasitic capacitance will seriously degrade the electronic system performance. Therefore, while providing ESD protection, a good ESD protection solution ought to have minimized parasitic capacitance.

High-speed data links require robust ESD protection with parasitic capacitance lower than 0.5 Pico farad (pF), which is very challenging in designs. For example, high-datarate ports, such as HDMI, USB and DVI, on the printed circuit boards (PCB) of modern electronic products (e.g., smart phones, tablets, LCD displays, etc.) requires standalone TVS protection parts, either in discrete device or integrated circuit format. There are many prior arts offering such TVS protection solutions. FIG. 1 illustrates one such TVS protection solution consisting of diode ESD protection devices from the I/O port to the ground (GND) and power supply bus ($V_{DD}$), and an ESD clamping device between $V_{DD}$ and GND nodes. The power clamp device can be a Zener diode 10, a silicon-controlled rectifier (SCR) or other type of active conducting structures. The GND node may be replaced by a negative power supply ($V_{SS}$) as required by the PCB circuit. All ESD protection devices remain in "off" state without affecting the transient appears at I/O with respect to GND (denoted NS ESD mode), the lower ESD protection diode 12 turns on in forward mode to discharge the ESD transient. If a positive ESD transient occurs at I/O with respect to GND (denoted PS ESD mode), the upper ESD protection diode 14 in series with the Zener diode 10 will conduct the ESD pulse. When a positive ESD surge comes to I/O with respect to $V_{DD}$ (denoted PD ESD mode), the upper ESD protection diode 14 will be turned on to discharge the ESD surge in forward mode. If a negative ESD pulse appears to I/O with respect to $V_{DD}$ (denoted ND ESD mode), the lower ESD protection diode 12 and the Zener diode 10 will form a conduction path to drain the ESD pulse. Often on electronic system board, a multiple-channel TVS IC 16 may be used for ESD protection as shown in FIG. 2. The equivalent circuit for the parasitic capacitance of a TVS component is depicted in FIG. 3 where the capacitances 18, 20 and 22 are parasitic capacitances associated with the upper and lower ESD protection diodes 14 and 12 and Zener diode 10 shown in FIG. 1, respectively.

Suppose that $C_1$, $C_2$ and $C_Z$ respectively denote the capacitances 18, 20 and 22. Refer to the exemplar TVS component depicted in FIG. 1, one important parameter is the input parasitic capacitance (denoted as $C_{IO}$) measured at the I/O with respect to GND, which has direct impact on the data rate of the electronic systems. From FIG. 3, we have $C_{IO}=C_2//(C_1+C_Z)$. $C_{IO}$ is typically measured from I/O to GND under a positive voltage bias from 0V to $V_{DD}$ (e.g., 0V-5V). Under such biasing condition, $C_2$ and $C_Z$ are mainly reverse biased PN junction capacitance that are relatively small; while $C_1$ is forward biased, leading to a relatively larger PN junction capacitance that is also strongly affected by the bias voltage. In general, there are two major issues associated $C_{IO}$ for the TVS IC. First, the PN junction capacitances are relatively high even at reverse biasing because the ESD diodes are large to ensure robust ESD protection. Second, $C_1$ of the forward-biased ESD diode 14 increases significantly as the biasing voltage increases. Both the relatively high ESD-induced capacitance and its strong relationship with the I/O bias (i.e., capacitance not flat against voltage bias) have substantial negative impact on system performance. Therefore, an ultra small and very flat (i.e., against biasing voltage) $C_{IO}$ is strongly preferred for modern high-speed electronics. While the TVS component illustrated in FIG. 1 is used as an example to describe this design problem, the same issue applies to all kinds of on-chip ESD protection designs at IC level and various TVS and lightning protection designs at system PCB board level.

In view of the problems and shortcomings of the prior art, the present invention provides a low capacitance transient voltage suppressor, so as to solve the afore-mentioned problems of the prior art.

SUMMARY OF THE INVENTION

The objective of the present invention is to provide a low capacitance transient voltage suppressor, which uses a small parasitic capacitance in series with forward-biased and reverse-biased parasitic capacitances to establish an ultra-low and flat capacitance in a path during normal operation. The ultra-low and flat capacitance is critical to many high-speed electronics products.

To achieve the abovementioned objectives, the present invention proposes a low capacitance transient voltage suppressor. The transient voltage suppressor comprises a first diode with a first anode thereof coupled to an I/O port and the first diode induces a first parasitic capacitance. A first cathode of the first diode and a second cathode of a second diode are respectively coupled to first and second end of a resistor. A second anode of the second diode is coupled to a low-voltage terminal, and the second diode induces a second parasitic capacitance. The first and second diodes are turned on and discharge an electrostatic discharge (ESD) transient voltage through the resistor during electrostatic discharge (ESD) stressing. A third anode and a third cathode of a third diode are respectively coupled to the second cathode and the resistor. The third diode induces a third parasitic capacitance smaller than the first and second parasitic capacitances, and the third parasitic capacitance in series with the first and second parasitic capacitances dominate a small capacitance in a path during normal operation.

Below, the embodiments are described in detailed in cooperation with the attached drawings to make easily understood the technical contents, characteristics, and accomplishments of the present invention.

DETAILED DESCRIPTION OF THE INVENTION

Figure 4:
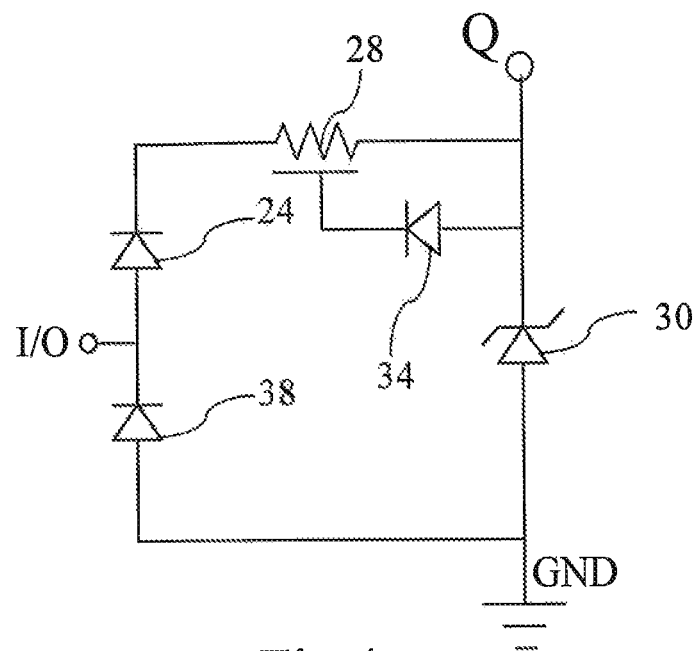
FIG. 4 is a diagram schematically showing a transient voltage suppressor circuit according to an embodiment of the present invention.
Figure 5:
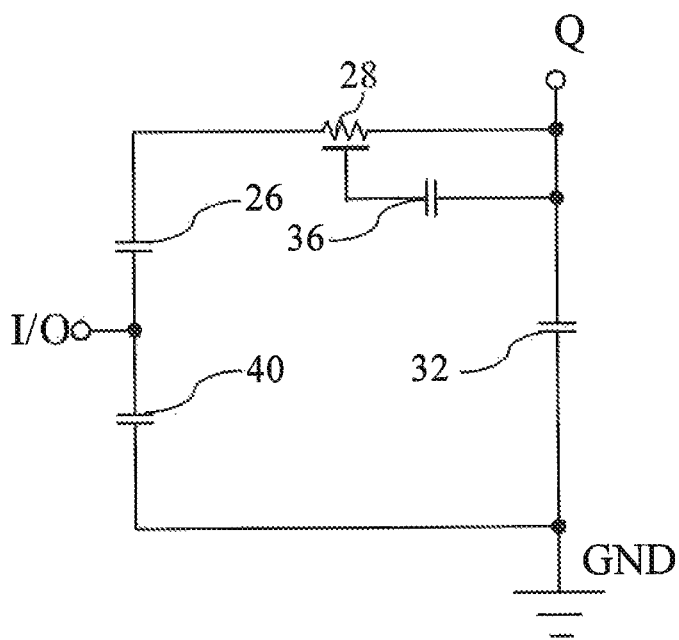
FIG. 5 is a diagram schematically showing an equivalent circuit for the parasitic capacitance of FIG. 4.
Figure 6:
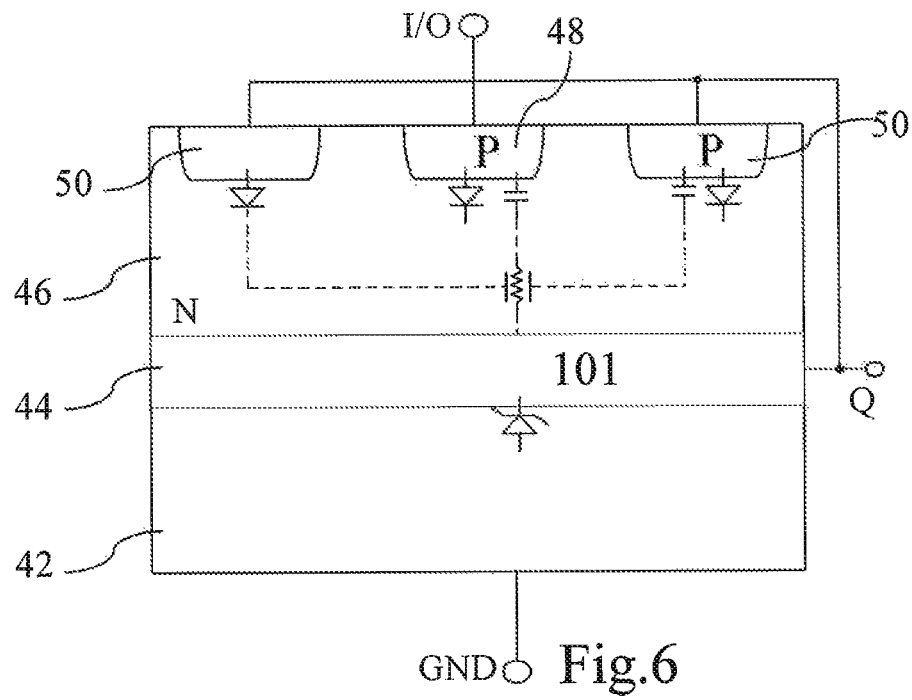
FIG. 6 is a sectional view showing the first, second, third diodes and a resistor according to the first embodiment of the present invention.

The present invention relates to the design methods of reducing the I/O ESD-induced parasitic capacitance (i.e., $C_{IO}$) of ESD protection solutions (on-chip ESD protection for ICs, as well as TVS and lightning protection for system boards) and the structures therefore. In one embodiment, a technique of introducing a small and distributed capacitor is utilized to achieve both ultra-low and ultra-flat parasitic $C_{IO}$. FIG. 4 is a transient voltage suppressor circuit of the present invention. FIG. 5 depicts the schematic equivalent circuit for the parasitic capacitance of FIG. 4. FIG. 6 describes one conceptual structural implementation of the new design method of FIG. 4. In concept, a small and distributed capacitor is introduced into the conduction path formed by $C_1$ and $C_Z$ in the TVS example shown in FIG. 1.

Refer to FIG. 4 and FIG. 5. The present invention comprises a first diode 24 with a first anode thereof coupled to an I/O port and the first diode 24 can induce a first parasitic capacitance 26. A first cathode of the first diode 24 is coupled to a first end of a resistor 28. A second end of the resistor 28 is coupled to a second cathode of a second diode 30 and a second anode of the second diode 30 is coupled to a low-voltage terminal. For example, the low-voltage terminal is grounded and the second diode 30 is a Zener diode. The second diode 30 can induce a second parasitic capacitance 32. The second cathode and the resistor 28 are respectively coupled to a third anode and a third cathode of a third diode 34. The third diode 34 can induce a third parasitic capacitance 36 smaller than the first and second parasitic capacitances 26 and 32. The I/O port and the low-voltage terminal are respectively coupled to a fourth cathode and a fourth anode of a fourth diode 38. The fourth diode 38 can induce a fourth parasitic capacitance 40. Besides, the Q node among the second end, the third anode and the second cathode is coupled to a high-voltage terminal.

The distributed unit consisting of the third parasitic capacitance 36 and a resistor 28 serves two purposes. First, during normal system operation, the tiny third parasitic capacitance 36 in series with the first and second parasitic capacitances 26 and 32 dominate a small capacitance in this circuit branch and assures a very small capacitance in this path due to the third parasitic capacitance 36. Therefore, the total $C_{IO}$ will become ultra low due to the small distributed parasitic capacitance 36. In addition, because the parasitic capacitance 36 is a reverse-biased PN junction capacitance at a positive biasing voltage, the parasitic capacitance 36 is not only very small, but also remains flat as the bias voltage increase positively. Therefore, the total $C_{IO}$ will be ultra low and flat against the positive bias voltage at the I/O. Second, the first and second diodes 24 and 30 are turned on and discharge an electrostatic discharge (ESD) transient voltage through the resistor during electrostatic discharge (ESD) stressing. Therefore, the present invention can successfully resolve the ESD design challenge described above. The ultra-low and flat capacitance is critical to many high-speed electronics products and high data rate interfaces, and the electric system performance is not degraded.

There are many ways to design a structure to realize this concept. Refer to FIG. 4 and FIG. 6. The second diode 30 is formed by a P-type substrate 42 and a first N-type layer 44 thereon, and a second N-type layer 46 is formed on the first N-type layer 44, and the resistor 28 is within the second N-type layer 46, and the P-type substrate 42 is coupled to the low-voltage terminal. The first diode 24 is a PN junction between the second N-type layer 46 and a first P-type heavily-doped area 48, and the third diode 34 is a PN junction between the second N-type layer 46 and at least one second P-type heavily-doped area 50, and the first P-type heavily-doped area 48 coupled to the I/O port and the second P-type heavily-doped area 50 coupled to the first N-type layer 44 are formed in the second N-type layer 46, and the second P-type heavily-doped area 50 is annually arranged at a side of the first P-type heavily-doped area 48 to achieve the new ultra-low-and-flat-capacitance TVS protection component. Materials of the substrate 42, the layers 44 and 46 and the doped areas 48 and 50 are exemplified by silicon.

Figure 1:
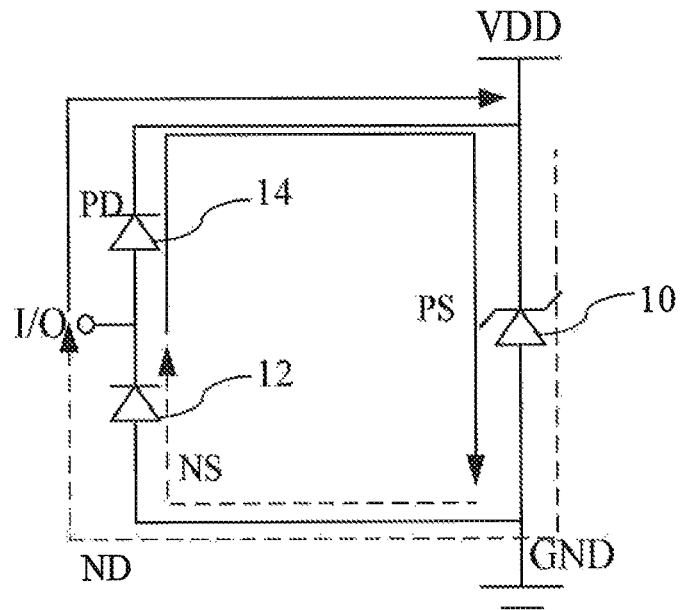
FIG. 1 is a diagram schematically showing a traditional transient voltage suppressor (TVS) protection.
Figure 2:
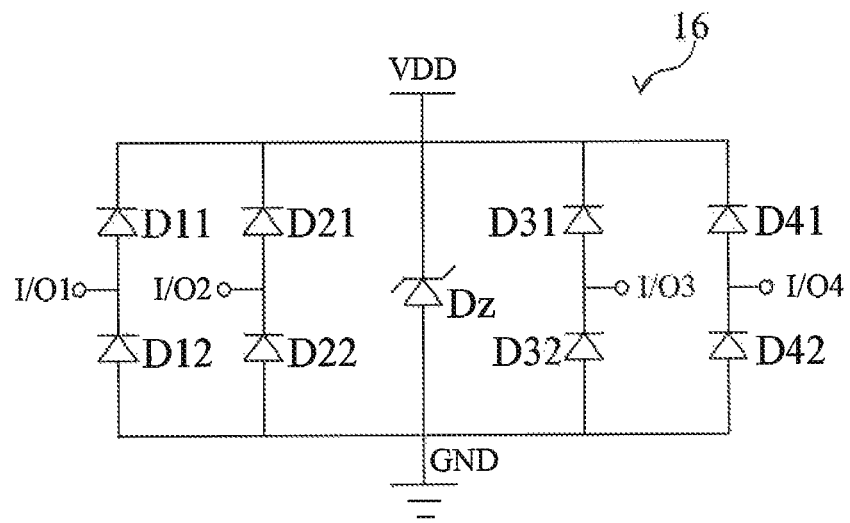
FIG. 2 is a diagram showing a traditional multiple-channel TVS integrated circuit (IC)
Figure 3:
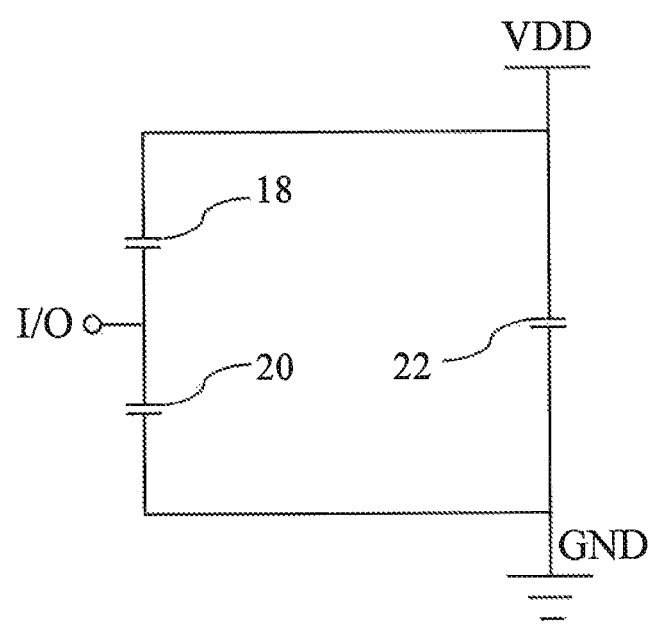
FIG. 3 is a diagram schematically showing an equivalent circuit for the parasitic capacitance of FIG. 1.
Figure 7:
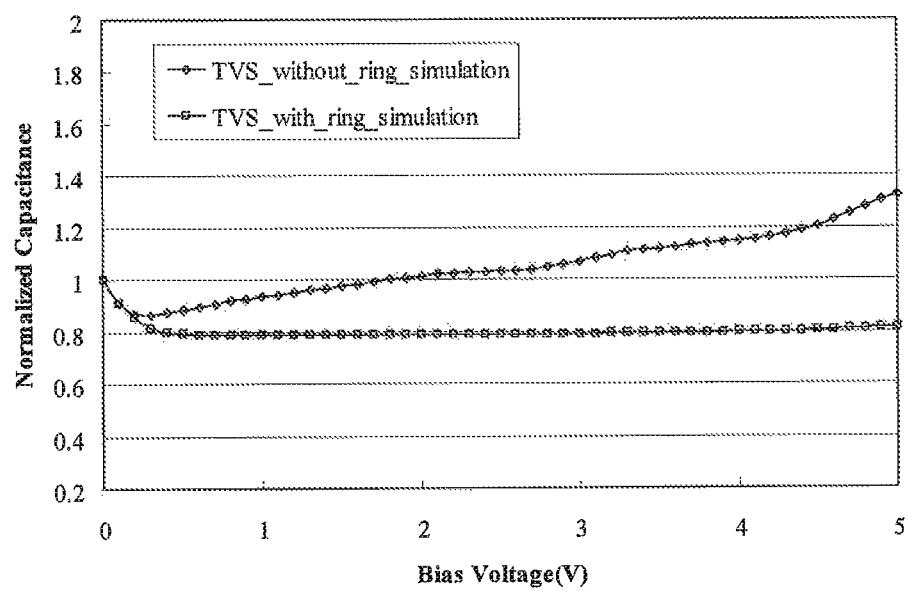
FIG. 7 is a diagram showing normalized capacitances with and without ring simulation according to an embodiment of the present invention.

The relatively doping levels for each silicon layers can be selected according to the design requirements, which can be determined by those skilled in the art. Proper metal interconnection can be designed to realize the required TVS circuit schematic as shown in FIG. 1. In physical layout, the second P-type heavily-doped area 50 is preferred to surround the first P-type heavily-doped area 48, either partially or completely. The layout of the second P-type heavily-doped area 50 can be a ring structure of circular, square, rectangular or other forms. The key is to make the second P-type heavily-doped area 50 physically small so that it shall not occupy much extra area and deliver a very small capacitance. While FIG. 6 illustrates an exemplar structure for a TVS component shown in FIG. 1, those with skills in the art may readily apply the method and structure to other types of TVS, lightning or on-chip ESD protection designs, such as the multiple-channel TVS IC shown in FIG. 2. While this example uses silicon, it can be readily implemented in other semiconductors. FIG. 7 shows the improvement results in lowering the ESD capacitance using the new method and structure corresponding to the exemplar TVS component described in FIG. 1. It readily confirms that the $C_{IO}$ for an original TVS without the second P-type heavily-doped area 50 increases almost monotonically with the biasing voltage.

However, the TVS component with the second P-type heavily-doped area 50 utilizing the invention not only achieves lower $C_{IO}$, but also ensures a very flat $C_{IO}$ against the biasing voltage.

Figure 8:
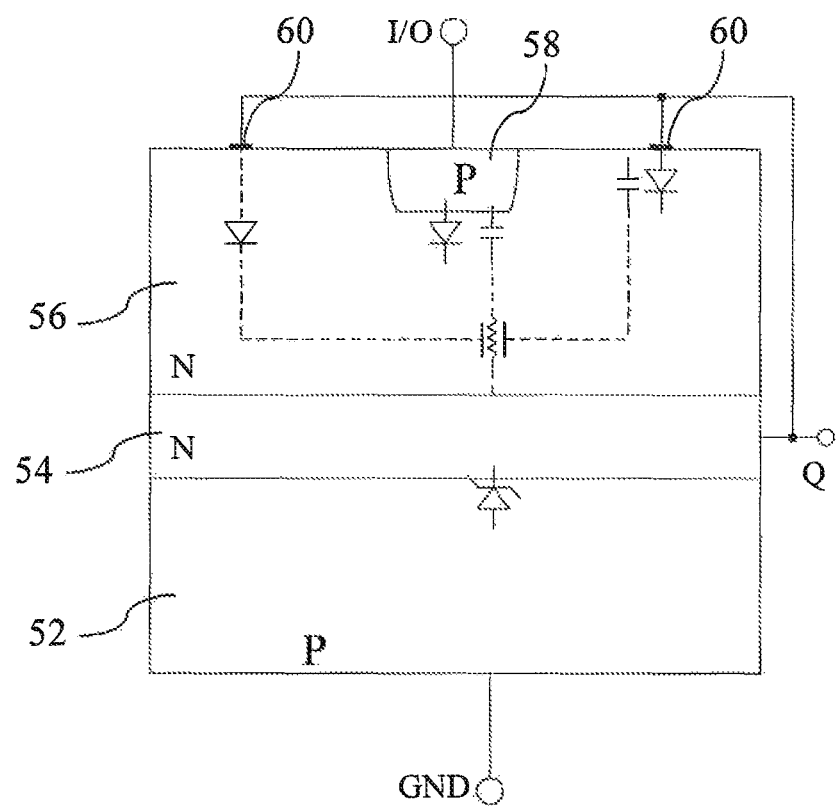
FIG. 8 is a sectional view showing the first, second, third diodes and the resistor according to the second embodiment of the present invention.

In another embodiment, as shown in FIG. 4 and FIG. 8, the TVS component described in FIG. 6 is implemented in a different method for its structure. Instead of using a PN junction to make the third diode 34, a metal-to-semiconductor diode (i.e., MS diode) is formed by depositing a thin metal line direct on the silicon. The second diode 30 is formed by a P-type substrate 52 and a first N-type layer 54 thereon, and a second N-type layer 56 is formed on the first N-type layer 54, and the resistor 28 is within the second N-type layer 56, and the P-type substrate 52 is coupled to the low-voltage terminal. The first diode 24 is a PN junction between the second N-type layer 56 and a P-type heavily-doped area 58, and the third diode 34 is a MS (metal-semiconductor) junction between the second N-type layer 56 and at least one thin metal line 60, and the P-type heavily-doped area 58 coupled to the I/O port is formed in the second N-type layer 56, and the thin metal line 60 coupled to the first N-type layer 54 is formed on the second N-type layer 56. The thin metal line 60 comprises titanium (Ti), wolfram (W), various metal alloys, or silicide metal. This metal-based TVS structure has the advantage of using a simpler fabrication processes because a MS junction can be formed easier and made smaller compared to its counterpart using a PN junction.

While the two embodiments use a simple TVS component shown in FIG. 1 to describe the new invention, it may be readily applied to various other system level TVS and lightning ICs, as well as on-chip ESD protection design by those skilled in the art. Similarly, while the above description relates to the $C_{IO}$ from I/O to GND, the method can be readily applied to lower the $C_{IO}$ between I/O to the high-voltage terminal, e.g., $V_{DD}$, by those skilled in the art.

In conclusion, the present invention establishes the third diode inducing the low capacitance to obtain the ultra-low input capacitance.

The embodiments described above are only to exemplify the present invention but not to limit the scope of the present invention. Therefore, any equivalent modification or variation according to the shapes, structures, characteristics and spirit of the present invention is to be also included within the scope of the present invention.

What is claimed is:

1. A low capacitance transient voltage suppressor, comprising:
    a first diode having an anode coupled to an I/O port, wherein said first diode induces a first parasitic capacitance;
    a resistor having a first terminal coupled to a cathode of said first diode, and a second terminal coupled to a common node;
    a second diode having a cathode coupled to said common node, and an anode coupled to a low-voltage terminal, wherein said second diode induces a second parasitic capacitance, and said first and second diodes are turned on to discharge an electrostatic discharge (ESD) transient voltage through said resistor during ESD stressing; and
    a third diode having an anode coupled to said common node and a cathode coupled to said resistor, wherein said anode of said third diode comprises a ring structure that laterally surrounds and is separated by a gap from said anode of said first diode, and wherein said third diode induces a third parasitic capacitance that is smaller than said first and second parasitic capacitances, and said third parasitic capacitance in series with said first and second parasitic capacitances dominates a small capacitance in a path during normal operation.

2. The transient voltage suppressor of claim 1, wherein said second diode comprises a P-type substrate and a first N-type layer thereon, and a second N-type layer on said first N-type layer, wherein said resistor is within said second N-type layer, and said P-type substrate is coupled to said low-voltage terminal.

3. The transient voltage suppressor of claim 2, wherein said first diode comprises a PN junction between said second N-type layer and a first P-type heavily-doped area, and wherein said third diode comprises a PN junction between said second N-type layer and at least one second P-type heavily-doped area, wherein said first P-type heavily-doped area coupled to said I/O port and said second P-type heavily-doped area coupled to said first N-type layer are formed in said second N-type layer.

4. The transient voltage suppressor of claim 2, wherein said first diode comprises a PN junction between said second N-type layer and a P-type heavily-doped area, and said third diode comprises a metal-semiconductor (MS) junction between said second N-type layer and at least one thin metal line, wherein said P-type heavily-doped area coupled to said I/O port is formed in said second N-type layer, and said thin metal line coupled to said first N-type layer is formed on said second N-type layer.

5. The transient voltage suppressor of claim 4, wherein said thin metal line comprises at least one of: titanium (Ti) and silicide metal.

6. The transient voltage suppressor of claim 4, wherein said thin metal line comprises tungsten (W).

7. The transient voltage suppressor of claim 1, wherein said second diode comprises a Zener diode.

8. The transient voltage suppressor of claim 1, wherein said common node comprises a high-voltage terminal.

9. The transient voltage suppressor of claim 1, wherein said low-voltage terminal is grounded.

10. The transient voltage suppressor of claim 1, wherein said ring structure is circular.

11. The transient voltage suppressor of claim 1, wherein each of said first, second, and third-diodes comprises a PN junction.

12. The transient voltage suppressor of claim 1, wherein said first diode comprises a PN junction, and said third diode comprises a metal-semiconductor (MS) junction.

13. The transient voltage suppressor of claim 3, wherein said second P-type heavily-doped area at least partially surrounds said first P-type heavily-doped area.

14. The transient voltage suppressor of claim 3, said second P-type heavily-doped area is smaller than said second N-type layer.

15. The transient voltage suppressor of claim 3, wherein said second P-type heavily-doped area comprises a ring structure.

16. The transient voltage suppressor of claim 2, wherein said second P-type heavily-doped area is annually arranged at a side of said first P-type heavily-doped area.

17. The transient voltage suppressor of claim 1, wherein said third diode comprises first and second PN junctions coupled in parallel.

18. The transient voltage suppressor of claim 17, wherein said first diode is disposed between said first and second PN junctions.

19. The transient voltage suppressor of claim 1, wherein said third diode comprises first and second MS junctions coupled in parallel.

20. The transient voltage suppressor of claim 19, wherein said first diode is disposed between said first and second MS junctions.

* * * * *